3,236,844
N,β-DISUBSTITUTED AND PHENETHYL
PIPERIDINES
Edward D. Amstutz, Bethlehem, Pa., Frank P. Palopoli and Charles H. Tilford, Cincinnati, Ohio, and Richard F. Shuman, Allentown, Pa., assignors to Richardson-Merrell Inc., New York, N.Y., a corporation of Delaware
No Drawing. Filed Feb. 2, 1962, Ser. No. 170,828
5 Claims. (Cl. 260—247.5)

This invention relates to new chemical compounds which possess useful physiological properties and to a process for the preparation of these compounds.

The new compounds of the present invention may be regarded as basic ether derivatives of N,β-disubstituted-α-phenethylamines. They may be represented by the formula:

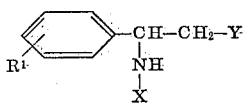

in which the group represented by $R^1$ is a basic ether group of the formula $O(CH_2)_n$—Am, in which Am is a dialkylamino- or a monocyclic-nitrogen-containing heterocyclic group joined to the alkyl chain through a nitrogen atom. The dialkylamino groups contain alkyl groups of from one to four carbon atoms, while the monocyclic heterocyclic groups include the morpholino, piperidino, and pyrrolidino groups. $n$ is an integer from two to four. One of the radicals X and Y represents a heterocyclic radical and the other an aryl or substituted aryl.

Typical of the aryl groups that X or Y may represent are phenyl, chlorophenyl, bromophenyl, iodophenyl, fluorophenyl, trifluoromethylphenyl, tolyl, and methoxyphenyl. Typical heterocyclic groups that X or Y may represent are pyridyl, piperidyl and N-lower alkyl piperidyl.

This invention also includes nontoxic acid addition salts and quaternary salts of the compounds of the general formula.

The compounds of this invention may be prepared in several ways in accordance with the individual structural requirements. The N,β-disubstituted-α-phenethylamines may be prepared by the reaction of a suitable organometallic derivative of X or Y with an anil substituted with the —O(CH$_2$)$_n$—Am group. The anil is obtained by the reaction of a basic-ether substituted benzaldehyde with an amine derivative of X or Y.

Illustrations of preparative methods are schematically represented as follows:

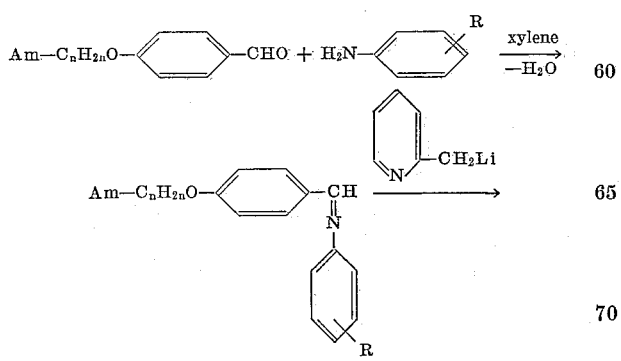

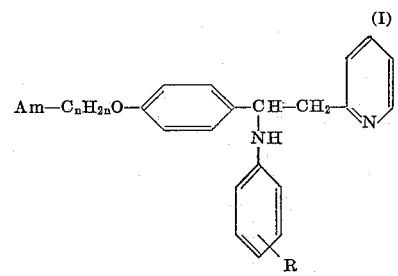

Compounds of Type I may be catalytically hydrogenated to give the piperidine derivatives, (II):

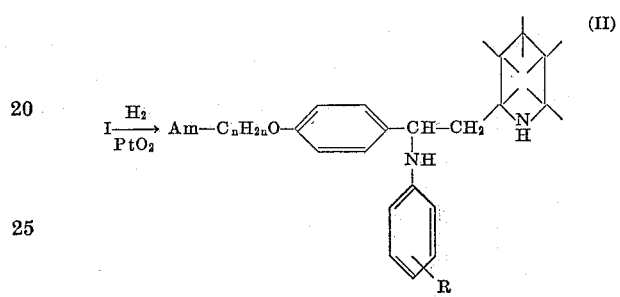

The N-alkyl piperidine derivatives may be prepared in the following manner:

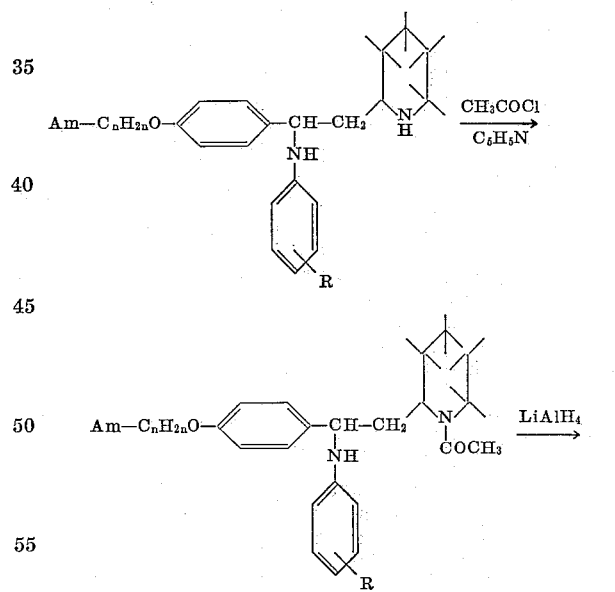

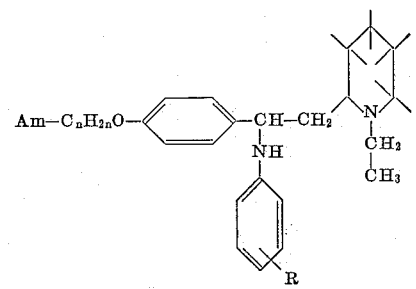

By substituting other acid chlorides in the above reaction, as for example, propionyl chloride, butyryl chloride, etc., the N-propionyl and N-butyryl derivatives are obtained, which on reduction with LiAlH$_4$ give rise to the corresponding N-propyl and N-butyl derivatives.

The reaction of an organometallic with the anils of our invention is usually carried out at room temperature or slightly above in an anhydrous ether solvent. However, these reactions are operative at somewhat lower temperatures, for example to −20° C. and also at higher temperatures to about 150° C. These temperatures may be achieved by cooling the reaction mixture, or by use of a higher boiling solvent such as tetrahydrofuran (B.P. 65° to 66° C.) or di-n-butylether (B.P. 142° C.). Another method generally used to achieve higher reaction temperatures is the preparation of the organometallic in the usual manner in diethyl ether and then replacing the ether with a hydrocarbon solvent such as benzene (B.P. 80° C.) or toluene (B.P. 110° C.) for the subsequent reaction of the organometallic reagent with the anil. The reaction time here is not critical and at the preferred temperatures the reaction is ordinarily complete in a short period, i.e., thirty minutes to two hours. For these reactions preferred procedure involves the use of substantially equimolar quantities of the reactants, however a 10 to 20% excess of the organometallic is commonly used.

After the reaction is completed the reaction mixture is decomposed by pouring onto ice, water, or a saturated ammonium chloride solution. The organic layer is separated, washed with water, and dried. Upon removal of the solvent the product may be isolated generally as yellowish highly viscous oils, some of which may crystallize. Purification is effected by distillation or chromatography on alumina.

The anils, i.e., the product of the reaction of an appropriately-substituted benzaldehyde with an appropriately-substituted aniline may be prepared by a variety of methods. For example, reaction may be conveniently effected by bringing the reactants together in a non-reactive solvent such as alcohol, n-heptane, benzene, toluene, or xylene. Elevated temperatures such as the reflux temperature are generally employed to increase the reaction rate. As the reaction proceeds, water is formed, and in hydrocarbon solvents the water may be azeotropically removed and collected in a trap. After the theoretical amount of water is collected the reaction is considered completed. This may require from two to forty-eight hours. Anil formation may also be effected merely by mixing the reactants at elevated temperature, i.e., at temperatures above room temperature. Preferably, the reaction is carried out at temperatures in the range from about 80° to 150° C. The reaction time here is not critical and at the preferred temperatures the reaction is ordinarily complete in a short period, i.e., 30 minutes to two hours. The proportion of the reactants is not critical, however a preferred procedure involves the use of substantially equimolar quantities of the reactants. The products may be purified by distillation, or by column chromatography on alumina.

The compounds of the present invention are potent inhibitors of cholesterol biosynthesis. These compounds appear to work by a different mechanism than triparanol and other related basic ether substituted triphenylethanols by inhibiting cholesterol synthesis at a different stage in the biosynthetic pathway. These compounds are, therefore, useful in reducing the total sterol content in blood and tissues.

The compounds are active when administered by the oral route and may be given in any conventional dosage form such as capsule, tablet, suspension or the like in amounts ranging from 10 mgs. to one gram per day.

*Example I.*—*2 - {2 - (p - chloroanilino)-2-[p-(β-diethylaminoethoxy)phenyl]ethyl}pyridine*

One hundred ml. of an ether solution containing 29 g. (0.09 mole) of N-[p-(β-diethylaminoethoxy)-benzylidine]-p-chloroaniline was added with stirring to 0.14 mole of 2-picolyllithium in 140 ml. of ether. Addition was carried out at a rate sufficient to maintain a gentle refluxing of the ether. The mixture was refluxed for 30 minutes and then the complex was decomposed with an aqueous solution of ammonium chloride. The organic layer was removed and dried over anhydrous sodium sulfate. The ether was removed at reduced pressure and the unreacted 2-picoline distilled off by heating the dark residue at 150° C. at 1 mm. of Hg pressure. The residue was crystallized from petroleum ether to give 24.7 g. of 2-{2-(p-chloroanilino)-2-[p-(β-diethylaminoethoxy)-phenyl]ethyl}pyridine, melting at 76° to 77° C.

The N-[p-(β-diethylaminoethoxy)benzylidine]-p-chloroaniline was prepared as follows:

A mixture of 20 g. (0.0945 mole) of p-(β-diethylaminoethoxy)benzaldehyde and 12.1 g. (0.0945 mole) of p-chloroaniline were heated in 25 ml. of refluxing 95% ethanol for 2 hours. The ethanol was removed and the residue was heated on an oil bath to 240°/0.5 mm. to remove unreacted starting material. Upon cooling, the residue solidified to give 29.8 g. of brownish yellow product. Recrystallization from petroleum ether gave a nearly-white solid, melting at 38° to 40° C.

*Example II.*—*2 - {2 - (p - chloroanilino)-2-[p-(β-diethylaminoethoxy)phenyl]ethyl}piperidine*

An acetic acid solution of 2-{2-(p-chloroanilino)-2-[p-(β-diethylaminoethoxy)phenyl]ethyl}pyridine was hydrogenated, using 0.2 g. of platinum oxide as catalyst and 60 pounds of hydrogen pressure. After the theoretical amount of hydrogen was absorbed, the catalyst was removed by filtration, the solvent evaporated and the acid salt neutralized. The desired product, 2-{2-(p - chloranilino)-2-[p-(β-diethylaminoethoxy)phenyl]-ethyl}piperidine was obtained as an oil, boiling at 144° C. at 0.2 mm. pressure.

*Example III.*—*2 - {2 - (p - toluidino) - 2-[p-(β-diethylaminoethoxy)phenyl]ethyl}pyridine*

The reaction of p-(β-diethylaminoethoxy)-benzaldehyde and p-toluidine by the procedure of Example I gave the desired anil, N-[p-(β-diethylaminoethoxy)benzylidine]-p-toluidine, as an oil, which was used without further purification. When this anil was used in place of the anil of Example I, 2-{2-(p-toluidino)-2-[p-(β-diethylaminoethoxy)phenyl]ethyl}-pyridine was obtained. The product, purified by chromatography on alumina, was obtained as a white solid melting at 77° to 79° C.

*Example IV.*—*2{2-(-toluidino)-2-[p-(β-diethylaminoethoxy)phenyl]ethyl}piperidine*

The product of Example III, 2-{2-(p-toluidino)-2-[p-(β-diethylaminoethoxy)phenyl]-ethyl}pyridine, was hydrogenated by the procedure of Example II to give the desired 2-{2-(p-toluidino)-2-[p-(β-diethylaminoethoxy)-phenyl]ethyl}piperidine as a white solid, melting at 78.5° to 79.5° C.

*Example V.*—*2-{2-anilino-2-[p-(β-dietylaminoethoxy)-phenyl]ethyl}pyridine*

The reaction of p-(β-diethylaminoethoxy)-benzaldehyde and aniline by the procedure of Example I gave the desired anil, N-[p-(β-diethylaminoethoxy)benzylidene]-aniline as an oil. When this anil was used in place of the anil of Example 1, 2-{2-(p-anilino)-2-[p-(β-diethylamino-ethoxy)phenyl]ethyl}pyridine was obtained as a white solid melting at 61° to 63° C.

*Example VI.*—*2-{2-(m-chloroanilino)-2-[p-(β-diethylaminoethoxy)phenyl]ethyl}pyridine*

The reaction of p-(β-diethylaminoethoxy)benzaldehyde and m-chloroaniline by the procedure of Example I gave the desired anil, N-[p-(β-diethylaminoethoxy)benzylidene]-m-chloroaniline, obtained as an oil. When this anil was used in place of the anil of Example I, 2-{2-(m-chloroanilino) - 2 - [p-(β-diethylaminoethoxy)phenyl]ethyl}pyridine was obtained as a nearly white solid, melting at 62° to 64° C.

*Example VII.—2-{2-(p-methoxyanilino)-2-[p-(β-diethylaminoethoxy)phenyl]ethyl}pyridine*

The reaction of p-(β-diethylaminoethoxy)-benzaldehyde and p-methoxyaniline by the procedure of Example I gave the desired N-[p-(β-diethylaminoethoxy)benzylidene]-p-methoxyaniline, which crystallized from petroleum ether as a white solid, melting at 66° to 67° C. When this anil was used in place of the anil of Example I, 2-{2-(p - methoxyanilino)-2-[p-(β-diethylaminoethoxy)phenyl]ethyl}pyridine was obtained, melting at 66° to 68° C.

*Example VIII.—2-{2-(p-fluoroanilino)-2-[p-(β-diethylaminoethoxy)phenyl]ethyl}pyridine*

The reaction of p-(β-diethylaminoethoxy)-benzaldehyde and p-fluoroaniline by the procedure of Example I gave the desired anil, N-[p-(β-diethylaminoethoxy)benzylidene]-p-fluoroaniline as an oil, B.P. 182° C./0.09 mm. When this anil replaced the anil of Example I, 2-{2-(p-fluoroanilino) - 2 - [p-(β-diethylaminoethoxy)phenyl] ethyl}pyridine was obtained, melting at 53° to 56° C.

*Example IX.—2-{2-(p-toluidino)-2-[p-(β-piperidinoethoxy)-phenyl]ethyl}pyridine*

The reaction of p-(β-piperidinoethoxy)benzaldehyde and p-toluidine by the procedure of Example I gave the desired N - [p-(β-piperidinoethoxy)benzylidene]-p-toluidene which crystallized from petroleum ether as a solid, melting at 70° to 72° C. When this anil was used in place of the anil of Example I, 2-{2-(p-toluidino)-2-[p-(β-piperidinoethoxy)phenyl]ethyl}pyridine was obtained, melting at 95° to 97° C.

*Example X.—2-{2(p-toluidino)-2-[p-(β-morpholinoethoxy)phenyl]ethyl}pyridine*

The reaction of p-(β-morpholinoethoxy)benzaldehyde and p-toluidine by the procedure of Example I gave the desired N-[p-(β-morpholinoethoxy)benzylidene]-p-toluidine, which crystallized from petroleum ether as a solid melting at 110° to 112° C. When this anil was used in place of the anil of Example I, 2-{2-(p-toluidino)-2-[p-(β - morpholinoethoxy)phenyl]ethyl}pyridine was obtained, melting at 103° to 105° C.

*Example XI—2{2-(p-anisidino)-2-[p-(β-pyrrolidinoethoxy)-phenyl]ethyl}pyridine*

The reaction of p-(β-pyrrolidinoethoxy)benzaldehyde and p-anisidine by the procedure of Example I gave the desired N-[p-(β-pyrrolidinoethoxy)benzylidene]-p-anisidine as a solid, melting at 85° to 87° C. When this anil was used in place of the anil of Example I, 2-{2-(p-anisidino) - 2-[p-(β-pyrrolidinoethoxy)phenyl]ethyl}pyridine was obtained, melting at 93° to 95° C.

*Example XII.—2-{2-(p-toluidino)-2-[p-(β-morpholinoethoxy)phenyl]ethyl}piperidine*

The product of Example X, 2-{2-(p-toluidino)-2-[p-(β-morpholinoethoxy)phenyl]ethyl}pyridine, was hydrogenated by the procedure of Example II to give 2-{2(p-toluidino) - 2-[p-(β-mopholinoethoxy)phenyl]ethyl}piperidine which did not crystallize and was isolated as a pale amber, viscous oil by chromatography on alumina.

*Example XIII.—2-{2-(m-trifluoromethylanilino)-2-[p-(β-diethylaminoethoxy)phenyl]ethyl}pyridine*

The reaction of p-(β-diethylaminoethoxy)benzaldehyde and m-trifluoromethylaniline by the procedure of Example I gave the desired N-[p-(β-diethylaminoethoxy)benzylidene]-m-trifluoromethylaniline as an oil. When this anil was used in place of the anil of Example I, 2-{2-(m-trifluoromethylanilino) - 2-[p-(β-diethylaminoethoxy)phenyl]ethyl}pyridine was obtained as a pale yellow, viscous oil, which was purified by chromatography on an alumina column.

*Example XIV.—2-{2-(p-chloroanilino)-2-[m-(β-diethylaminoethoxy)phenyl]ethyl}pyridine*

The reaction of m-(β-diethylaminoethoxy)benzaldehyde and p-chloroaniline by the procedure of Example I gave the desired N-[m-(β-diethylaminoethoxy)benzylidine]-p-chloroaniline as an oil, B.P. 215° C. at 0.3 mm. When this anil was used in place of the anil of Example I, 2 - {2 - (p-chloroanilino) - 2 - [m-(β-diethylaminoethoxy) phenyl]ethyl}pyridine was obtained as an oil, B.P. 207° to 209° C. at 0.08 mm.

*Example XV.—2-{2-(p-chloroanilino)-2-[p-(γ-dimethylaminopropoxy)phenyl]ethyl}pyridine*

The reaction of p-(γ-dimethylaminopropoxy)benzaldehyde and p-chloroaniline by the procedure of Example I gave the desired N-[p-(γ-dimethylaminopropoxy)benzylidene]-p-chloroaniline as a solid, melting at 62° to 64° C. When this anil was used in place of the anil of Example I, 2-{2-(p-chloroanilino)-2-[p-(γ-dimethylaminopropoxy) phenyl]ethyl}pyridine was obtained.

*Example XVI.—2-{2-anilino-2-[p-(γ-piperidinopropoxy) phenyl]ethyl}pyridine*

The reaction of p-(γ-piperidinopropoxy)benzaldehyde and aniline by the procedure of Example I gave the desired N-[p-(γ-piperidinopropoxy)benzylidene]aniline as a solid, melting at 49.5° to 50.5° C. When this anil was used in place of the anil of Example I, 2-{2-anilino-2-[p-(γ-piperidinopropoxy)phenyl]ethyl}pyridine was obtained, melting at 88° to 91° C.

*Example XVII.—2-{α-[p-(β-diethylaminoethoxy)phenyl]-β-phenylethylamino}pyridine*

The reaction of p-(β-diethylaminoethoxy)benzaldehyde and 2-aminopyridine gave the desired anil, N-[p-(β-diethylaminoethoxy)benzylidene]-2-pyridylamine. When this anil was allowed to react with an ether solution of benzyl magnesium chloride as in the procedure of Example I, there was obtained 2-{α-[p-(β-diethylaminoethoxy)phenyl]-β-phenylethylamino}pyridine, melting at 75° to 76° C.

*Example XVIII.—4-{2-(p-chloroanilino)-2-[p-(β-diethylaminoethoxy)phenyl]ethyl}pyridine*

When 4-picolyl lithium replaced 2-picolyl lithium in Example I, there was obtained 4-{2-(p-chloroanilino)-2-[p - (β - diethylaminoethoxy)phenyl]ethyl}pyridine as a light amber, viscous oil, which was purified by chromatography on an alumina column.

*Example XIX.—2-{2-[p-(β-diethylaminoethoxy)phenyl]-2-(p-toluidino)ethyl}-1-ethylpiperidine*

The piperidine derivative of Example IV was allowed to react with one equivalent of acetyl chloride in pyridine to give the intermediate 2-{2-[p-(β-diethylaminoethoxy) phenyl]-2-(p-toluidino)ethyl}-1-acetylpiperidine. Reduction of this acetyl derivative with LiAlH₄ in ether gave the desired 2-{2-[p-(β-diethylaminoethoxy)phenyl]-2-(p-toluidino)ethyl}-1-ethylpiperidine as a light amber oil, which was purified by chromatography on an alumina column.

We claim:
1. A compound of the formula:

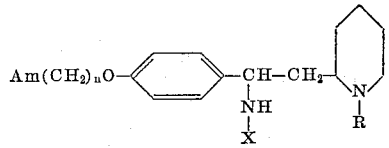

wherein R is a member selected from the group consisting of H and lower alkyl, X is a member selected from the group consisting of phenyl, halophenyl, trifluoromethylphenyl, loweralkylphenyl and loweralkoxyphenyl; $n$ is an integer from 2 to 4; and Am is a member selected from the group consisting of diloweralkylamino, morpholino, piperidino and pyrolidino, the nitrogen atoms of said groups being attached to the $—(CH_2)_n—$ group.

2. 2-{2-(p-toluidino)-2-[p-($\beta$-morpholinoethoxy)phenyl]ethyl}piperidine.

3. 2-{2-[p-($\beta$-diethylaminoethoxy)phenyl] - 2-(p-toluidino)ethyl}-1-ethylpiperidine.

4. 2-{2-(p-chloroanilino)-2-[p-($\beta$-diethylaminoethoxy)phenyl]ethyl}piperidine.

5. 2-{2-(p-toluidino) - 2 - [p-($\beta$-diethylaminoethoxy)phenyl]ethyl}piperidine.

References Cited by the Examiner
UNITED STATES PATENTS

| | | | |
|---|---|---|---|
| 2,971,001 | 2/1961 | Palopoli et al. | 260—294.7 |
| 3,075,971 | 1/1963 | Bencze | 260—296 X |
| 3,097,207 | 7/1963 | Maddox et al. | 260—294.7 |

OTHER REFERENCES

Jour. American Med. Assoc. (Council on Drugs), vol. 178, No. 6, p. 574 (Nov. 1961).

Reiber et al., Jour. Am. Chem. Soc., vol. 62, pp. 3028–30 (1940).

The Washington Daily News, April 19, 1962, page 9, last col.

WALTER A. MODANCE, *Primary Examiner.*

DUVAL T. McCUTCHEN, NICHOLA S. RIZZO, JOHN D. RANDOLPH, *Examiners.*